UNITED STATES PATENT OFFICE.

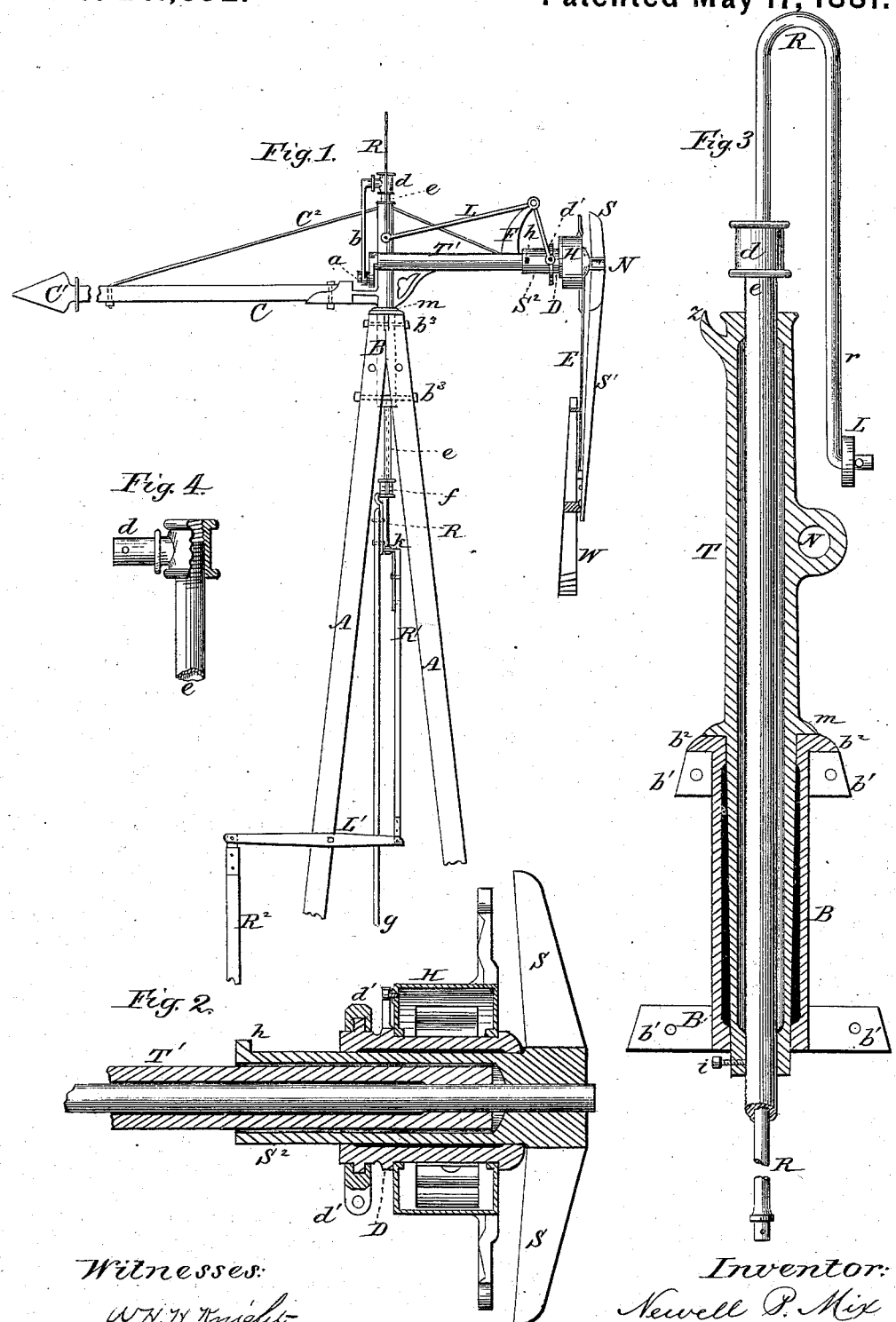

NEWELL P. MIX, OF AVENUE, OHIO.

WINDMILL.

SPECIFICATION forming part of Letters Patent No. 241,692, dated May 17, 1881.

Application filed December 13, 1880. (Model.)

*To all whom it may concern:*

Be it known that I, NEWELL P. MIX, a citizen of the United States, residing at Avenue, in the county of Franklin and State of Ohio, have invented certain new and useful Improvements in Windmills, of which the following is a specification.

The objects of my improvements are to obtain a strong and compact construction of turntable, and its connection with the tower-bed; to provide a more compact arrangement of plunger-rod in relation to the turn-table, and in relation to the connections for controlling the wheel-wings for turning them in and out of the wind, and to render the operation of the mill more reliable.

Referring to the accompanying drawings, Figure 1 represents my improved windmill in elevation, a portion only of the tower being shown; Fig. 2, a sectional view on an enlarged scale, showing the spider and sliding sleeve of the wind-wheel, and the telescoping connection of the hub thereof with the tubular bearing-arm of the turn-table for the wheel-shaft; Fig. 3, a sectional view on an enlarged scale, showing the vertical tubular spindle of the turn-table, its tubular beds, and the relation therewith of the tubular plunger-rod and the connecting-rod for controlling the wheel-wings; and Fig. 4, the cross-head which serves to connect the plunger-rod with the pitman of the wheel-shaft.

The tower consists of four posts, A, converging to and inclosing at their upper ends the vertical tubular bed B for the turn-table, and to which they are firmly bolted, the said bed having lugs $b'$ formed on each end for that purpose. The vertical spindle part T of the turn-table is seated within this bed, and for this purpose said bed has an interior bearing at each end, which, while reducing the friction, gives an effective bearing to the spindle. The tubular bed has a rim, $b^2$, on its upper end, and the tubular spindle has a collar, $m$, which, resting upon the rim $b^2$, supports the turn-table and allows it to turn freely under the action of the wind upon the wheel. The spindle bearing part of the turn-table passes through the tubular bed a sufficient distance to receive a screw or stop, $i$, Fig. 3, on its lower end, to prevent the turn-table from being lifted from its tubular bed by the force of the wind. The turn-table is cast with a horizontal tubular arm, T', which receives and supports the shaft N of the wind-wheel, being provided with interior bearings at each end for that purpose. The vertical spindle part T is also tubular, to receive and support the tubular plunger-rod $e$, and for this purpose it is provided with interior bearings at each end, while the tubular plunger-rod receives and supports the rod R, which connects with and by which the wheel-wings W are controlled, thereby giving a compact and durable construction and arrangement of these parts in which one is within and supported by the other. The spindle part extends some distance above its connection with the tower, and it is from this part that the tubular bearing part T' for the wheel-shaft extends so as to support the wind-wheel clear of the tower, and to form a long bearing for the proper working of the plunger-rod. The horizontal tubular arm T' joins the spindle part T at the side, as shown more clearly in Fig. 3, and is braced at the junction, as shown in Fig. 1.

The tubular plunger-rod $e$ extends through the spindle part, and is provided on its upper end with a cross head, $d$, shown in detail in Fig. 4, the arm of which is connected, through the rod $b$, with the crank $a$ on the wheel-shaft, to give the reciprocating motion to the plunger-rod. The cross-head has an interior screw and the plunger-rod is screwed therein. The rod R passes through the plunger-rod, and has a return, $r$, or arched upper end, or equivalent connection above said plunger-rod, which extends down, and is connected, by a loose joint, to an angular lever, L, which being pivoted to a fulcrum-arm, F, cast upon the tubular arm, has its forked end turned down and connected, by loose joints, to the strap $d'$ of the sleeve D, on which the oscillating hub H is arranged, and which connects with the wheel-wings W by the extension-rods E, so that the wings, being loosely hung to the spider-spokes S', they are, by the connections described, turned in and out of the wind as required for stopping and starting the mill.

The spider S is formed with a tubular hub-extension, $S^2$, which telescopes with and revolves over the outer end of the tubular arm T' by its fixed connection with the outer end of the wheel-shaft, thereby inclosing the outer end of the shaft and its supporting turn-table arm. This tubular hub-extension $S^2$ carries the sliding sleeve D, which in turn carries the oscillating hub H, the inward sliding movement of said sleeve being limited by the stop $h$ on said hub-extension, and the sliding sleeve being connected to the hand-operating connecting-rod R by the lever L, for controlling the wind-wheel wings. The hub-extension $S^2$ has no interior bearing upon the turn-table arm T', but the wheel-shaft has an interior bearing at the outer end of said arm, which gives a very regular and easy action to the wheel. The tubular hub-extension $S^2$ does not touch the horizontal tubular arm of the turn-table, but is large enough to leave a space of about three-eighths of an inch between its inside and the outside of said arm. The spider S, of which the hub extension $S^2$ is a part, is keyed to the shaft N, and the latter has its bearing in the outer end of the tubular arm, whereby the tubular hub-extension revolves over and free of said arm, and thereby relieves all friction between these parts.

The plunger-rod $e$ is connected to the rod $g$ by a swivel, $f$, so as to turn with the turn-table without turning said rod $g$, while the rod R has a swivel-connection, $k$, with the rod R', which is jointed to one end of a horizontal lever, L', pivoted to the tower, and jointed at its other end to the hand-operating rod $R^2$, which leads to the ground, whereby the rod R may turn with the turn-table without affecting its hand-lever connections. The arms of the spider to which the spokes are attached are slightly inclined inward to bring the weight of the wheel-wings W in position where the outer shaft-bearing can best support them. The weight of the rod R about balances the combined weight of the rods R' $R^2$ and lever L, as they are supported by the lever L', which obviates the necessity of fastening the rod $R^2$ to either keep the wheel-wings in or out of the wind.

As a means of balancing the mill on its tubular bed, I provide a counterbalance-arm, C, secured to and projecting from the spindle T, opposite to its shaft-bearing arm T', and having a weight, C' at its outer end. A truss-brace, $C^2$, connects with a lug on the turn-table arm T', and passing over a projection, Z, at the top of the spindle T, is secured to the lever C at or near its weighted end, to afford the proper support to the counter-balance.

To stop the motion of the wheel the rod $R^2$ is pulled down, which, through the lever L', pushes up the rods R' and R, and the long end of the lever L, which, by its forked connection with the sleeve D, draws it, with the oscillating hub H, spirally toward the tower and against the stop $h$, which pushes out the extension-rods E and causes the wings to turn their inner ends from the center, so that the slats of the wings are parallel with the wheel-shaft. Reversing the movement of the rod $R^2$ reverses the movement of the rods R' and R and lever L, and forces out the sleeve D to the spider, which pulls the rods E so as to bring the wings into the wind.

The invention herein is an improvement upon the patent granted to myself and Wm. E. Jacobs, February 23, 1875, in which an oscillating and a sliding hub are used with connections for controlling the wheel-wings.

Instead of the arched or return upper end of the rod R, the latter may be connected with the angular lever by a link or rod; but I prefer to make the rod R in one piece, and the fulcrum F, instead of being cast integral with the tubular arm T', may be bolted thereto.

By passing the tubular plunger-rod through the tubular spindle of the turn-table, a supporting bearing at each end thereof is obtained for said plunger-rod, and the latter thus supported serves to support the hand shifting-rod and to render the working of these parts more satisfactory.

The tubular bed B is firmly secured to the tower by the lugs $b'$, which project radially from the upper and lower ends of said bed and fit between the posts A, and are bolted thereto by the bolts $b^3$, as shown in Fig. 1, so that the bed cannot be turned under the action of the turn-table, and the top of the tower-posts are thereby firmly secured together.

I claim—

1. In combination, the vertical tubular spindle T of the wind-wheel turn-table, its tubular bed B, the tubular plunger-rod $e$ passing through and supported by a bearing at each end of said spindle, the hand shifting-rod R, passing through said supported plunger-rod and supported by it, and the tubular shaft-bearing arm T' projecting from said spindle, substantially as described, for the purpose specified.

2. The combination of the wind-wheel having controllable wings, the turn-table and its fixed tubular bed, with the tubular plunger-rod $e$, passing through and supported by a bearing at each end of the tubular spindle of said turn-table, the hand shifting-rod R, passing through said supported plunger-rod and supported by it, the angular lever L, and the sliding sleeve D, substantially as described, for the purpose specified.

3. The combination, with a wind-wheel having controllable wings, the sliding sleeve D, and means for connecting the wings therewith, of the angular lever L, the tubular plunger-rod $e$, and the hand shifting-rod R, extending through said plunger-rod and having the arched upper end or return, $r$, and secured to said lever, the plunger-rod and the shifting rod being supported substantially as described, for the purpose specified.

4. In combination, the extended tubular hub $S^2$ of the wind-wheel and the tubular arm T' of the turn-table telescoping with said tubular hub, and the mechanism for controlling the wings of said wind-wheel, substantially as and for the purpose set forth.

5. In a windmill having the combination of an extended tubular hub adapted to telescope with the tubular bearing-arm and the wheel-shaft supported therein, the said shaft having a bearing in the inclosed end of the tubular arm, and the extended tubular hub revolving free of said shaft-supporting arm, substantially as described, for the purpose specified.

6. The combination of the wind-wheel, its extended tubular hub $S^2$, having the stop $h$, the sliding sleeve D, and the oscillating hub H, upon said extended tubular hub, and the tubular shaft-bearing arm T', with the angular lever L, pivoted upon said arm, the tubular plunger-rod $e$, and the shifting-rod R, substantially as described, for the purpose specified.

In testimony whereof I have hereunto set my hand this 27th day of November, A. D. 1880, in the presence of two subscribing witnesses.

NEWELL P. MIX.

Witnesses:
J. T. HOFFMAN,
EDWARD C. SHILLING.